(12) United States Patent
Trigg

(10) Patent No.: US 7,669,836 B2
(45) Date of Patent: Mar. 2, 2010

(54) BRACKET

(75) Inventor: Rodney Trigg, Cabarita (AU)

(73) Assignee: Trigg's Trellis Supplies Pty Ltd, Victoria (AU)

( * ) Notice: Subject to any disclaimer, the term of this patent is extended or adjusted under 35 U.S.C. 154(b) by 0 days.

(21) Appl. No.: 11/909,963

(22) PCT Filed: Apr. 13, 2006

(86) PCT No.: PCT/AU2006/000515

§ 371 (c)(1),
(2), (4) Date: Apr. 30, 2008

(87) PCT Pub. No.: WO2006/108242

PCT Pub. Date: Oct. 19, 2006

(65) Prior Publication Data

US 2009/0050866 A1    Feb. 26, 2009

(30) Foreign Application Priority Data

Apr. 13, 2005    (AU)    ............... 2005901819

(51) Int. Cl.
*E04H 17/26*    (2006.01)

(52) U.S. Cl. ..................... 256/65.03; 248/300

(58) Field of Classification Search ............. 256/65.02, 256/65.03, 65.07, 65.09; 248/248, 300; 52/655.1, 52/712
See application file for complete search history.

(56) References Cited

U.S. PATENT DOCUMENTS

| | | | | |
|---|---|---|---|---|
| 826,125 A * | 7/1906 | Steinmetz | .................. | 411/458 |
| 949,075 A * | 2/1910 | Hulett | ........................ | 403/190 |
| 1,098,227 A * | 5/1914 | Casper | ...................... | 248/248 |
| 1,297,584 A * | 3/1919 | Mock | .......................... | 411/458 |
| 1,329,268 A * | 1/1920 | Dickelmann et al. | ........ | 411/461 |
| 1,341,113 A * | 5/1920 | Dottl et al. | .................. | 248/74.1 |
| 1,649,206 A * | 11/1927 | Yawman | .................. | 182/228.3 |
| 1,755,201 A * | 4/1930 | Blackburn et al. | ............ | 248/71 |
| 1,995,173 A * | 3/1935 | Ehle et al. | .................... | 411/459 |
| 2,099,273 A * | 11/1937 | Myer | ......................... | 403/281 |
| 2,155,893 A * | 4/1939 | Fulton | ........................ | 403/243 |
| 2,275,282 A * | 3/1942 | Bigham | ...................... | 248/538 |
| 2,358,490 A * | 9/1944 | Corral Uribe | ........... | 292/307 R |
| 2,608,386 A * | 8/1952 | Hart | ........................ | 256/65.06 |
| 3,833,201 A * | 9/1974 | Dill | ............................ | 256/35 |
| 4,280,686 A * | 7/1981 | Wack | ...................... | 256/65.07 |
| 5,190,268 A | 3/1993 | Espinueva | | |
| 5,267,718 A * | 12/1993 | Sheehan | .................. | 248/475.1 |
| 5,328,139 A * | 7/1994 | Barnes | ..................... | 248/475.1 |
| 5,588,629 A * | 12/1996 | Barnes | ..................... | 248/475.1 |
| 5,865,586 A * | 2/1999 | Neville | ....................... | 411/459 |
| 7,178,305 B2 * | 2/2007 | Petrova | ....................... | 52/715 |

* cited by examiner

Primary Examiner—Daniel P Stodola
Assistant Examiner—Joshua T Kennedy
(74) Attorney, Agent, or Firm—Townsend and Townsend and Crew LLP

(57) ABSTRACT

A bracket having a main body with attachment structure for fixing the bracket to a first post and fastening means for securing the bracket relative to a second post. The bracket is preferably used for strengthening a post assembly for a fence or trellis system.

18 Claims, 2 Drawing Sheets

BRACKET

FIELD OF THE INVENTION

The present invention relates to a bracket particularly, but not exclusively, for use in strengthening a post assembly.

RELATED APPLICATION

This application claims priority from AU 2005901819, the contents of which are incorporated herein by reference.

BACKGROUND OF THE INVENTION

It is known to enhance load carrying capacity of a post assembly of a trellis or fence system by securing a stay post diagonally between first and second upright posts, which are then placed under tension to support the fence or trellis. For that purpose, a notch may be formed in either end of the stay post to assist in locating the stay post relative to the upright posts. However, the structural integrity of the stay post may be compromised as a result, leading to potential failure of the post assembly.

OBJECT OF THE INVENTION

The present invention seeks to provide a bracket to assist in strengthening a post assembly.

SUMMARY OF THE INVENTION

In accordance with the present invention, there is provided a bracket having a main body with attachment structure extending from a front surface, for fixing the bracket to a first post, and fastening means projecting from an opposite surface, for securing the bracket relative to a second post, wherein the attachment structure includes at least one projecting spike arranged to be embedded in the first post and wherein the fastening means includes teeth, for embedding in the second post.

Preferably, two spikes are provided, spaced apart laterally of the main body of the bracket.

Preferably, the spikes are profiled to resist movement of the bracket in a first direction relative to the first post.

Preferably, the bracket includes a tab angled relative to the main body of the bracket, for abutment with a side of the first post.

In another aspect, there is provided a bracket having a main body with attachment structure for fixing the bracket to a first post and fastening means for securing the bracket relative to a second post, wherein the attachment structure includes two spikes spaced apart laterally of the main body and a tab angled relative to the main body of the bracket, for abutment with a side of the first post.

Preferably, each of the spikes is generally triangular in shape with a base adjacent and parallel to a lateral side of the bracket and a substantially perpendicular edge toward a first end of the bracket, to resist movement in a first direction.

Preferably, the fastening means includes teeth for embedding in the second post.

Preferably, the teeth are profiled to resist movement of the bracket in a second direction, relative to the second post.

Preferably, the teeth are provided in two rows, along lateral sides of the bracket.

Preferably, the rows are angled toward each other.

Preferably, the bracket includes at least one aperture for receipt of a fastener such as a screw or the like.

Preferably, the bracket is formed from a single piece of material.

Preferably, the material is galvanised steel.

In another aspect, there is provided a post assembly including at least one bracket, as described above.

In another aspect, there is provided a bracket for interconnecting first and second posts, including a main body with spikes projecting forwardly of a front surface of the body and teeth projecting rearwardly of an opposite surface wherein the spikes are arranged to embed in an end of the first post to locate the bracket relative thereto and the teeth are profiled to embed in a side of the second post, when the second post is arranged adjacent the end of the first post.

In another aspect, there is provided a method of producing the above described bracket including forming the bracket from a single piece of material.

Preferably, the rows of teeth are formed by deformation away from the main body.

Preferably, the spikes and tab are formed by being deformed away from the main body.

In another aspect, there is provided a post assembly including a first post, positioned diagonally between a second and third post and a bracket, as described above, for connecting one end of the first post to the adjacent second or third post.

In yet another aspect, there is provided a method of installing a post assembly, as described above, including:
  installing the strainer post and backing post;
  attaching a lower one of the brackets to the backing post;
  fitting the stay post to the lower bracket; and
  fitting an upper one of the brackets between the stay post and the strainer post.

BRIEF DESCRIPTION OF THE DRAWINGS

The invention is described, by way of non-limiting example only, with reference to the accompanying drawings, in which.

DETAILED DESCRIPTION OF THE INVENTION

Figure 1:
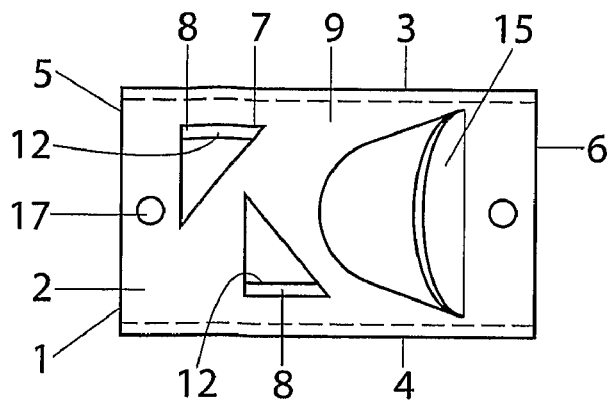
FIG. 1 is a plan view of a bracket.
Figure 2:
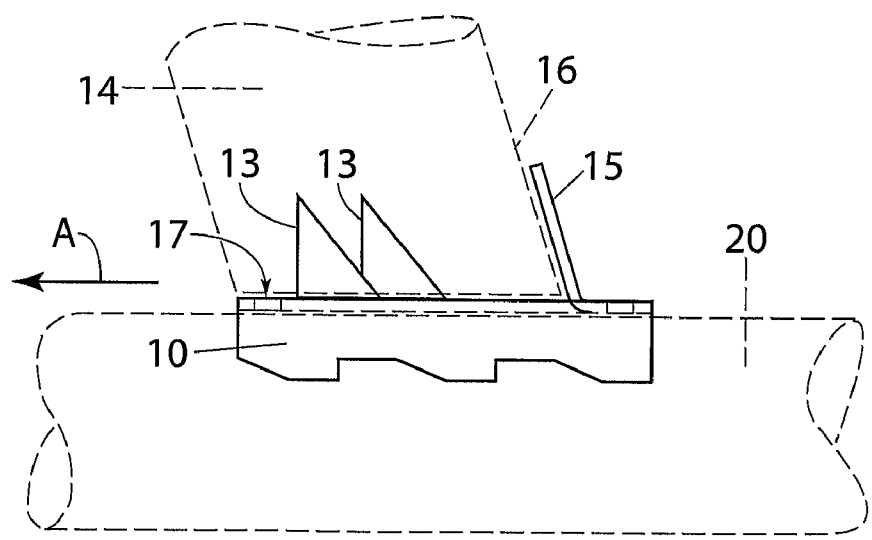
FIG. 2 is a side elevation of the bracket.
Figure 3:
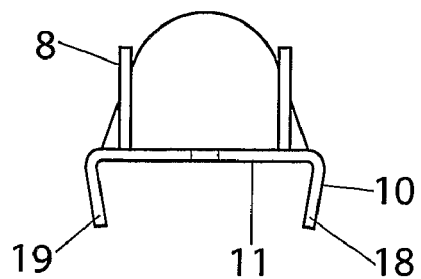
FIG. 3 is an end elevation of the bracket.

Referring firstly to FIGS. 1 to 3, a bracket 1 is shown as including a main body 2 with lateral sides 3, 4 and first and second ends 5, 6. Attachment structure 7, in the form of spikes 8 extend from a front surface 9 and fastening means 10 project from an opposite rear surface 11.

The spikes 8 are formed by a deformation process such as cutting and stamping, so as to have a generally triangular shape, with the base 12 of each spike 8 being adjacent and parallel to the lateral sides 3, 4 of the bracket 1. As a result, after formation of the spikes 8, a triangular opening associated with each spike is left in the body 2 of the bracket 1.

Each spike 8 is profiled to present a substantially perpendicular edge 13 toward the first end 5 of the bracket 1, which will resist movement of the bracket 1 in a first direction indicated by arrow "A", when the bracket is mounted to a first post 14.

The bracket 1 also includes a tab 15 which is angled relative to the main body 2 for abutment with a side 16 of the post 14, when the bracket 1 is mounted thereto. The tab 15 is also formed by stamping, preferably at the same time as the spikes 8 are formed.

The tab 15 is shown as rounded, in order to minimise the material stamped out of the main body 2, adjacent the openings remaining after the spikes 8 are formed. If, for example, the tab was formed of a square section of similar length dimension, the structural integrity of the bracket may be compromised due to close proximity with the openings.

An aperture 17 for receipt of a screw, nail or the like fastener (not shown) is also provided to assist in locating the bracket 1 relative to the post 14.

The fastening means 10 is provided in the form of two rows of teeth 18, 19. The teeth are profiled to be embedded in a second post 20 and to resist movement in a second direction indicated by arrow "B", opposite to the first direction. The rows of the teeth 18, 19 are formed, again by a process of plastic deformation, from the main body 2 and preferably angle toward each other.

A second aperture 21 is provided for receipt of an additional fastener that may be used to further secure the bracket 1 to the post 20, if required.

The bracket is preferably in the order of 100 mm long and 60 mm wide. The spikes are preferably in the order of 25 mm in height with a base length of about 20 mm. The tab has a length dimension in the order of 35 mm. The rows of teeth 18, 19 are about 17 mm in depth and angled away from the main body 2 by about 80 degrees. Each tooth of the respective row of teeth 18, 19 is about 24 mm in length, with a depth of about 5 mm. The bracket is preferably formed from a single piece of steel, in the order of 2.5 to 3 mm thick.

Since the bracket is formed from a single piece of steel, there are no welded joins that may weaken over time. The steel may be galvanised to resist rust, for a longer life span. The slight angle between the rows of teeth 18, 19 allows the bracket 1 to be installed in both large diameter and smaller diameter posts, such as 3 inch posts. The relative angling between the rows of teeth also enhances the ability of the bracket to maintain its shape.

As noted above, the rows of teeth 18, 19 are arranged to bite into the second post 20, however the parallel relationship of the teeth also serves to guide the bracket 1 evenly onto the post.

Figure 4:
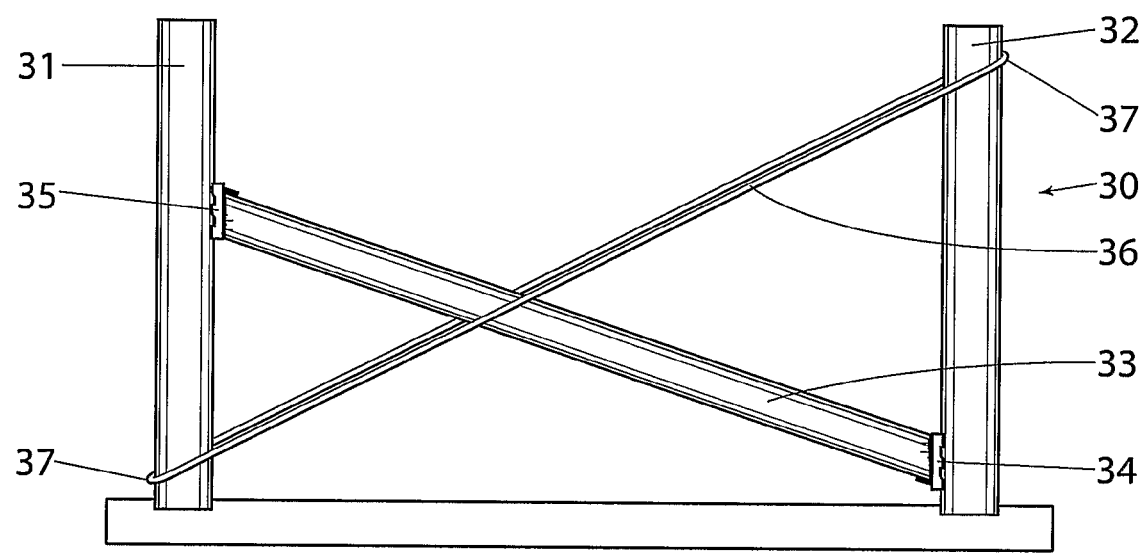
FIG. 4 is a diagrammatic view of a post assembly.

Referring now to FIG. 4, a post assembly 30 is shown as including a strainer post 31, a backing post 32 and a stay post 33 extending diagonally therebetween. As can be seen, a bracket 1 is provided at either end of the stay post 33. In order to install the assembly 30, the strainer and backing post 31, 32 are first installed. The stay post 33 is then seated in position, which will give the required angle to cut the stay post 33 ends. Once the ends have been cut, a lower bracket 34 (formed in accordance with bracket 1) is screwed into position on the backing post 32. The stay post 33 is then fitted on the lower bracket 34. A top bracket 35 (also formed in accordance with bracket 1) is then fitted between the stay and strainer posts 31, 33 and hammered down to a required height. The top bracket 35 may then be screwed in place. For extra stability, a wire loop 36, running at opposite angle to the stay post 33, will ensure the backing post 32 will not lean away and allow the strainer post 31 to move. A staple 37 may be provided on the outside of the strainer and backing post to hold preferably two loops of the wire in place. Once the wires are tensioned, the brackets 34, 35 will bite into the timber to complete the assembly.

The bracket 1 easily and reliably locates relative to the stay post as the wire is tensioned since the two triangular spikes prevent the stay post from moving sideways. The tab prevents the stay post from moving upwards/downwards depending on its position. The screw holes placed at each end only assist with initial installation and the bracket does not otherwise rely on these for any of its support strength.

As may be appreciated then, the bracket 1 assists with easy installation, and strengthening of end post assemblies, for fencing and vineyard trellising purposes without the need for notches in the stay post, as provided in the prior art.

The invention claimed is:

1. A bracket comprising:
   a main body having substantially parallel lateral sides,
   at least one projecting spike extending from a front surface of said main body for embedding into an end of a first post to fix the bracket to the first post,
   two vertical flanges extending rearward from said substantially parallel lateral sides of said main body, each flange defined by a plurality of teeth projecting therefrom for securing and aligning the bracket onto a second post,
   wherein each tooth comprises a forward tapered leading edge, allowing the bracket to be embedded into a side of the second post when the bracket is moved in a forward, substantially vertical, direction, and a rear trailing edge profiled to resist movement and disengagement of the bracket, once embedded into the side of the second post, when the bracket is moved in a reverse direction, thereby securing the bracket relative to the second post.

2. A bracket as claimed in claim 1, wherein the at least one spike is provided in the form of two spikes spaced apart laterally of the main body of the bracket.

3. A bracket as claimed in claim 2, wherein the spikes are profiled to resist movement of the bracket in a first direction relative to the first post.

4. A bracket as claimed in claim 1, further including a tab angled relative to the main body of the bracket, for abutment of a side of the first post.

5. A bracket as claimed in claim 1, wherein the two flanges are angled toward each other.

6. A bracket as claimed in claim 1, including at least one aperture for receipt of a fastener such as a screw or the like.

7. A bracket as claimed in claim 1 formed of a single piece of material.

8. A bracket as claimed in claim 7, wherein the material is galvanised steel.

9. A method of producing a bracket as claimed in claim 1 including forming the bracket from a single piece of material.

10. A post assembly including a first post, positioned diagonally between a second and third post and a bracket as claimed in claim 1 for connecting one end of the first post to the adjacent second or third post.

11. A post assembly as claimed in claim 10, including two brackets wherein a second one of the brackets is inverted and attached to a second end of the first post to connect the first post to the other one of the second or third post.

12. A post assembly as claimed in claim 11, wherein the first post is in the form of a stay post, the second post is in the form of a backing post and the third post is in the form of a strainer post.

13. A bracket comprising:
   a main body having substantially parallel lateral sides,
   two spikes projecting laterally from a front side of the main body for fixing the bracket to a first post,
   two vertical flanges extending rearward from said substantially parallel lateral sides of said main body, each flange defined by a plurality of teeth projecting therefrom for securing and aligning the bracket onto a second post,
   wherein the main body further includes a tab angled relative to the main body, guiding an end of the first post onto the two spikes for abutment, and
   wherein each tooth in each of the two rows of teeth comprises a forward tapered leading edge, allowing the bracket to be embedded into a side of the second post when the bracket is moved in a forward, substantially vertical, direction, and a rear trailing edge profiled to resist movement and disengagement of the bracket, once embedded into the side of the second post, when the bracket is moved in a reverse direction, thereby securing the bracket to the second post.

14. A bracket as claimed in claim 13, wherein each of the spikes is generally triangular in shape with a base adjacent and parallel to a lateral side of the bracket and a substantially perpendicular edge toward a first end of the bracket, to resist movement in a first direction.

15. The bracket of claim 13, wherein the two flanges are angled toward each other.

16. A bracket for interconnecting first and second posts comprising:
- a main body having substantially parallel lateral sides,
- two spikes projecting laterally from a front side of the main body for fixing the bracket to a first post,
- two vertical flanges extending rearward from said substantially parallel lateral sides of said main body, each flange defined by a plurality of teeth projecting therefrom for securing and aligning the bracket onto a second post,
- wherein the main body further includes a tab angled relative to the main body, guiding an end of the first post onto the two spikes for abutment, and
- wherein each tooth in each of the two rows of teeth comprises a forward tapered leading edge that slopes from the flange to an apex, allowing the bracket to be embedded into a side of the second post when the bracket is moved in a forward, substantially vertical, direction, and a rear trailing edge that extends sharply from the apex to the flange to resist movement and disengagement of the bracket, once embedded into the side of the second post, when the bracket is moved in a reverse direction, thereby securing the bracket relative to the second post.

17. A bracket as claimed in claim 16, further including a tab angled relative to the main body of the bracket for abutment with a side of the first post.

18. The bracket of claim 16, wherein the two flanges are angled toward each other.

* * * * *

UNITED STATES PATENT AND TRADEMARK OFFICE
CERTIFICATE OF CORRECTION

| | | |
|---|---|---|
| PATENT NO. | : 7,669,836 B2 | Page 1 of 1 |
| APPLICATION NO. | : 11/909963 | |
| DATED | : March 2, 2010 | |
| INVENTOR(S) | : Rodney Trigg | |

It is certified that error appears in the above-identified patent and that said Letters Patent is hereby corrected as shown below:

On the front page of the Letters Patent, please replace the Assignee name, to correct a typographical error, with the following:

Triggs' Trellis Supplies Pty Ltd, Victoria (AU)

Signed and Sealed this

Fourth Day of May, 2010

David J. Kappos
*Director of the United States Patent and Trademark Office*